United States Patent [19]

Wright

[11] 3,758,838

[45] Sept. 11, 1973

[54] ELECTRONIC CIRCUIT

[75] Inventor: Keith Lawrence Wright, Leicester, England

[73] Assignee: The Rank Organization, London, England

[22] Filed: Dec. 22, 1971

[21] Appl. No.: 210,967

[52] U.S. Cl. .................. 318/597, 318/596, 318/635

[51] Int. Cl. .......................................... G05b 11/18

[58] Field of Search ..................... 318/635, 597, 596

[56] References Cited

UNITED STATES PATENTS

| | | | |
|---|---|---|---|
| 3,382,422 | 5/1968 | Meir | 318/597 |
| 3,201,675 | 8/1965 | Curran et al. | 318/635 X |
| 3,510,737 | 5/1970 | Brown et al. | 318/635 X |
| 3,083,321 | 3/1963 | Howe | 318/635 X |

*Primary Examiner*—T. E. Lynch
*Attorney*—Holcombe, Wetherill & Brisebois

[57] ABSTRACT

An electronic circuit which gives an output corresponding to a first input so long as that output is within limits set by a second input. When the output goes beyond these limits, a diode connected thereto is forward biased to establish a high loop gain feedback path holding the output constant.

8 Claims, 2 Drawing Figures

ELECTRONIC CIRCUIT

Figure 1:
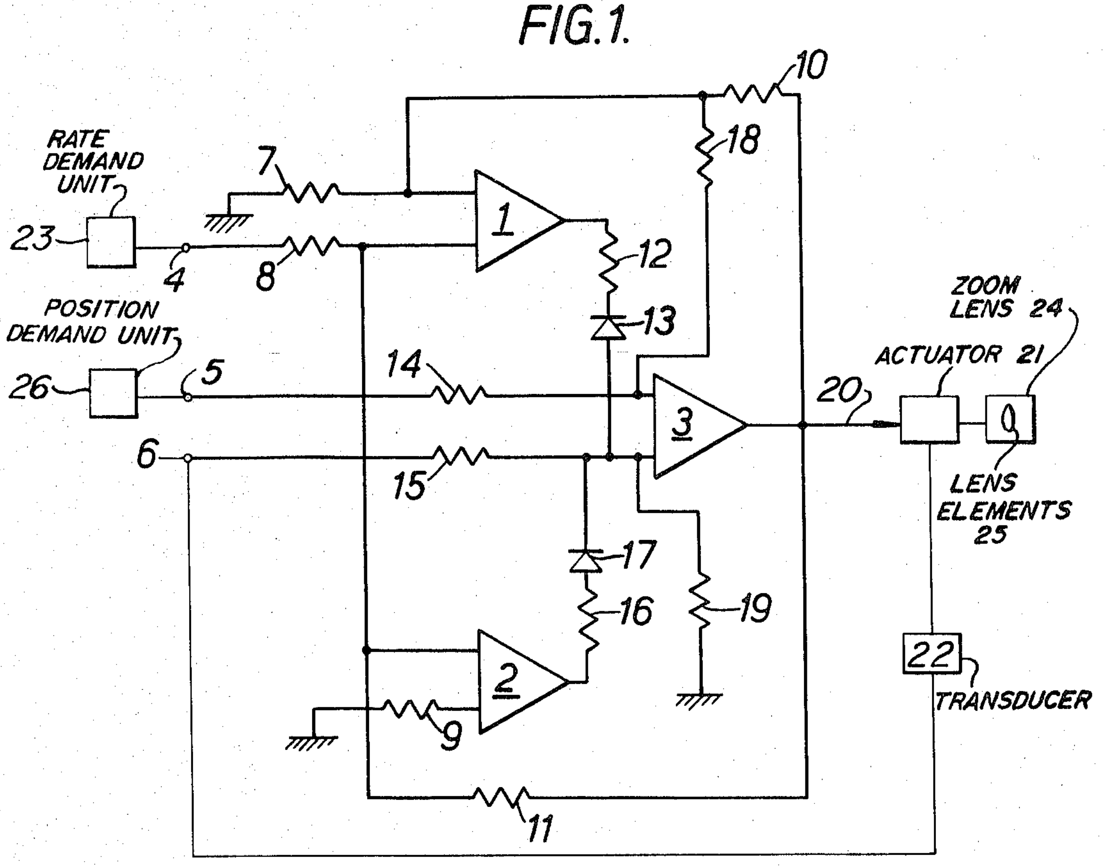

This invention relates to an electronic circuit for developing an output signal in response to two independently variable input signals. The circuit according to the invention is especially useful in servo systems and may for example be used in a servo-controlled zoom lens.

As is well known, a servo system may operate by means of either positional or velocity control. In the former mode of operation it is known to provide limitation of the actuator velocity, while in the latter it is known to provide positional limitation. In such known systems, however, it is necessary to have separate circuitry for the two types of limitation; for example it is common to use one potentiometer to provide positional information and a second to provide velocity information.

An object of the present invention is to provide a simplified means and method for giving positional limitation during velocity control and velocity limitation during positional control.

Accordingly, the present invention provides an electronic circuit for developing an output signal in response to two independently variable input signals, including means for developing a first signal as a function of one of the input signals, means for developing a second signal proportional to the other input signal, comparison means for comparing said first and second signals, and switching means for passing said first signal as an output signal when one of the first and second signals is the greater and passing the second signal as the output signal when the other of the first and second signals is the greater, whereby the output signal is a function of the one input signal only within a limit set by the other input signal.

The circuit preferably includes further comparison means for comparing the inverse of said second signal with said first signal and in which the switching means is arranged to pass said first signal as the output signal when the first signal lies between the second signal and its inverse and to pass the second signal as the output signal when the first signal is outside the limits set by the second signal and its inverse.

The or each comparison means may comprise an operational amplifier. Preferably, the switching means comprises a diode connected in series with the or each operational amplifier and arranged to be forward or reverse biased in accordance with the amplifier output.

Preferably also, the means for developing the first signal comprises a further operational amplifier arranged to compare said one input signal with a reference signal and to produce said first signal proportional to the difference therebetween.

The forward biasing of either diode preferably establishes a high loop gain path including the appropriate operational amplifier and the further operational amplifier to limit the output signal.

According to another aspect of the invention, a servo system includes a circuit as defined above, an actuator for providing movement in response to the output signal from the circuit, a feedback transducer arranged to produce a signal representing the position of the actuator which signal is applied to the circuit as said other input signal, and a demand unit arranged to provide signals representing the desired position of the actuator and the maximum desired rate of movement of the actuator which signals are applied to the circuit as said reference signal and said one input signal respectively.

The invention further provides a method of controlling the movement of an actuator, including providing a position demand signal representing the desired position of the actuator, deriving a reset signal representing the actual position of the actuator, and providing a rate demand signal representing the maximum desired rate of movement of the actuator, comparing the position demand and reset signals to obtain an error signal, comparing the error signal with the rate demand signal, and driving the actuator in accordance with the error signal when the error signal is proportionally less than the rate demand signal and in accordance with the rate signal when the error signal is proportionally greater than the rate demand signal.

Preferably, the method also includes comparing the error signal with the inverse of the rate demand signal, and driving the actuator in accordance with the error signal when the error signal lies between the rate demand signal and its inverse and in accordance with the rate demand signal when the error signal lies outside these limits.

Figure 2:
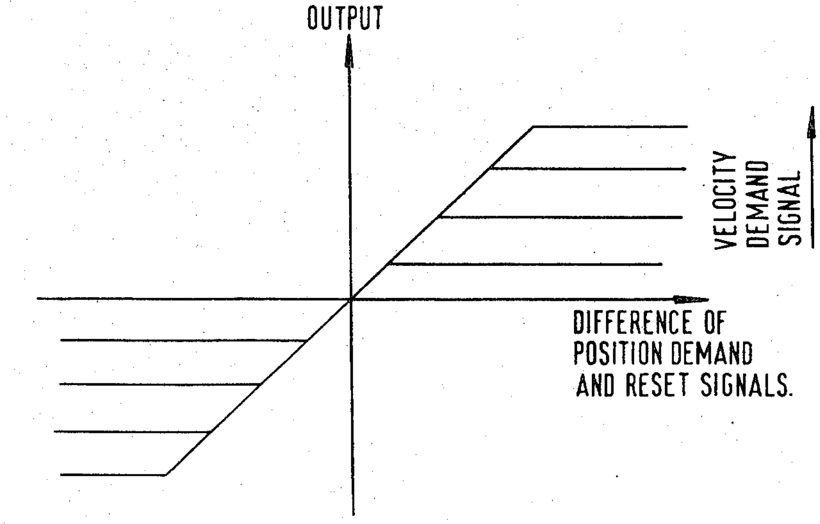

An embodiment of the invention will now be described, by way of example, with reference to the accompanying drawings, in which:

FIG. 1 is a circuit diagram of an electronic circuit according to the invention; and FIG. 2 illustrates the operation of the circuit of FIG. 1.

In a zoom lens 24 the zoom or focus adjustment may be made by means of a servo-controlled actuator 21 driving the appropriate lens element 25. A control system, of which the circuit of FIG. 1 forms part, allows the operator to demand a given position of the actuator and/or a given rate of movement by making adjustments to a position demand unit 26 or to a rate demand unit 23.

In the circuit shown in FIG. 1, a high gain operational amplifier 3 is arranged to compare a position demand signal generated in the position demand unit 26 and representing the desired position of the actuator, with a position reset signal representing the actual position of the actuator 21, and from a potentiometer or transducer 22 driven by the actuator 21 to provide an error signal representing the difference between the two. The position demand signal from the position demand unit 26 is applied to a terminal 5 and is passed to one input of the operational amplifier 3 via a resistor 14, and is compared with the output at 20 of the amplifier 3 which is fed back to the same input via a resistor 18. The position reset signal from the transducer 22 is applied to a terminal 6 and passes to the other input of the amplifier 3 via a resistor 15; a grounded reference is also fed to this input via a resistor 19.

A second operational amplifier 1 receives at one input via a resistor 8 a rate demand signal, from the rate demand unit 23 representing the maximum desired rate of movement, or velocity, of the actuator 21; this is applied to a terminal 4. The other input of the amplifier 1 receives a grounded reference via a resistor 7. The output of the first amplifier 3 at 20 is fed back to the inputs of the amplifier 1 via resistors 10 and 11. The amplifier 1 therefore acts in conjunction with the resistors 7, 8, 10 and 11 to compare the output of the operational amplifier 3 with the rate demand signal from the rate demand unit 23. The output of the amplifier 1 is applied through a resistor 12 to a diode 13 the other side of which is connected to the position reset signal input of the operational amplifier 3.

The rate demand signal and the output of the amplifier 3 are also fed to a further operational amplifier 2. In this case, however, the signals are applied, via resistors 8, 11 respectively, to a common input and, since the other input of the amplifier 2 is grounded via a resistor 9, the amplifier 2 operates with the resistors 7, 9 and 11 to subtract the rate demand signal from the signal fed back from the operational amplifier 3; in other words the output of the amplifier 3 is compared with the inverse of the rate demand signal. The output of the further amplifier 2 is connected through a resistor 16 and diode 17 to the position reset input of the amplifier 3. It should be noted that the diode 17 is oppositely poled to the diode 13.

In operation, the position demand and reset signals at 5 and 6 from the demand units 26 and 23 are compared by the amplifier 3 to generate an error signal at 20. If this signal lies within the limits set by the rate demand signal and its inverse, then the outputs of the amplifiers 1 and 2 are such that the diodes 13, 17 are reverse biased. However, if these limits are exceeded then the output of the appropriate amplifier 1 or 2 causes the respective diode 13 or 17 to be forward biased, thus establishing a high loop gain feedback path through the amplifiers 3 and 1 or 2 to limit the output signal at 20 to the value set by the rate demand signal. The diodes 13 and 17 thus operate in a switching mode. This operation is illustrated in FIG. 2 which shows that the circuit of the invention gives an output which is a function of an input up to a saturation level determined by another input. It can thus be used to give velocity limitation to a positional servomechanism.

It may, moreover, be used to provide positional limitation in a velocity servomechanism, for example to halt the actuator at the limit of its travel. If the rate demand signal at 4 is set at zero then the output at 20 is zero irrespective of the inputs at 5 and 6. The position demand signal applied to the input 5 is now set to represent the limit of travel, and by increasing the rate demand signal, the actuator will move under velocity control as far as the maximum movement specified by the signal at 5.

It will be apparent that the amplifier 3 could be combined with a single one of the amplifiers 1, 2 to give an operation which would be illustrated by the appropriate half of FIG. 2 about its vertical axis. Such a circuit would be suitable as a function generator where signals of one polarity only were to be handled.

It will also be appreciated that strictly speaking the signals at 4 and 20 are proportionally compared owing to the presence of the various resistors.

The invention thus provides a circuit which may be used with a single potentiometer or like feedback device in a servomechanism to give either positional limitation during velocity control or vice versa.

I claim:

1. An electronic circuit for developing an output signal in response to two independently variable input signals, comprising:

means coupled to receive one of said input signals for developing a first signal as a function of said one input signal, means coupled to receive the other of said input signals for developing a second signal proportional to said other input signal, first comparison means coupled to compare said first and second signals, second comparison means connected to compare said first signal with the inverse of said second signal, and switching means operative to pass said first signal as the output signal from said circuit when said first signal lies between said second signal and the inverse thereof, and to pass said second signal as the output from said circuit when said first signal lies outside the limits determined by said second signal and its inverse.

2. A circuit as claimed in claim 1, including further comparison means for comparing the inverse of said second signal with said first signal and in which the switching means is arranged to pass said first signal as the output signal when the first signal lies between the second signal and its inverse and to pass the second signal as the output signal when the first signal is outside the limits set by the second signal and its inverse.

3. A circuit as claimed in claim 1, in which the comparison means comprises an operational amplifier.

4. A circuit as claimed in claim 3, in which the switching means comprises a diode connected in series with the operational amplifier and arranged to be forward or reverse biased in accordance with the amplifier output.

5. A circuit as claimed in claim 4, in which the means for developing the first signal comprises a further operational amplifier arranged to compare said one input signal with a reference signal and to produce said first signal proportional to the difference therebetween.

6. A circuit according to claim 5 in which the forward biasing of said diode establishes a high loop gain path including the operational amplifier and the further operational amplifier to limit the output signal.

7. A servo system including a circuit as claimed in claim 5, an actuator for providing movement in response to the output signal from the circuit, a feedback transducer arranged to produce a signal representing the position of the actuator which signal is applied to the circuit as said other input signal, and a demand unit arranged to provide signals representing the desired position of the actuator and the maximum desired rate of movement of the actuator which signals are applied to the circuit as said reference signal and said one input signal respectively.

8. A method of controlling the movement of an actuator comprising the steps of:

providing a position demand signal representative of the desired position of said actuator, detecting the actual position of the actuator and providing a feedback signal representative thereof, providing a rate demand signal representative of the maximum desired rate of movement of said actuator, comparing said position demand signal and said feedback signal to obtain an error signal, comparing said error signal with the inverse of said rate demand signal, and driving said actuator in accordance with said error signal when said error signal lies between said rate demand signal and its inverse, and driving said actuator in accordance with said rate demand signal when said error signal lies outside the limits set by said rate demand signal and its inverse.

* * * * *

UNITED STATES PATENT OFFICE

CERTIFICATE OF CORRECTION

Patent No. 3,758,838 Dated September 11, 1973

Inventor(s) KEITH LAWRENCE WRIGHT

It is certified that error appears in the above-identified patent and that said Letters Patent are hereby corrected as shown below:

[73] Assignee: The Rank Organisation Limited, London, England

[30] Foreign Application Priority Data

February 9, 1971 Great Britain . . . 4254/71

Signed and sealed this 25th day of December 1973.

(SEAL)
Attest:

EDWARD M.FLETCHER,JR.
Attesting Officer

RENE D. TEGTMEYER
Acting Commissioner of Patents

ORM PO-1050 (10-69)

USCOMM-DC 60376-P69
☆ U.S. GOVERNMENT PRINTING OFFICE : 1969 O—366-334.